United States Patent
Jarman

(10) Patent No.: US 9,178,895 B2
(45) Date of Patent: Nov. 3, 2015

(54) DATA COMMUNICATION AUTHENTICATION SYSTEM AND METHOD

(75) Inventor: Michael Jarman, London (GB)

(73) Assignee: SECURE ELECTRANS LIMITED, London (GB)

( * ) Notice: Subject to any disclaimer, the term of this patent is extended or adjusted under 35 U.S.C. 154(b) by 0 days.

(21) Appl. No.: 13/389,302

(22) PCT Filed: Aug. 9, 2010

(86) PCT No.: PCT/GB2010/051314
§ 371 (c)(1),
(2), (4) Date: Mar. 22, 2012

(87) PCT Pub. No.: WO2011/015885
PCT Pub. Date: Feb. 10, 2011

(65) Prior Publication Data
US 2012/0180110 A1     Jul. 12, 2012

(30) Foreign Application Priority Data

Aug. 7, 2009  (GB) .................................. 0913934.6
May 24, 2010  (GB) .................................. 1008567.8

(51) Int. Cl.
*H04L 29/06* (2006.01)

(52) U.S. Cl.
CPC .............. *H04L 63/126* (2013.01); *H04L 63/08* (2013.01); *H04L 63/107* (2013.01)

(58) Field of Classification Search
CPC ......... H04L 63/12; H04L 63/08; H04L 63/10; H04L 63/107
USPC ................................................ 726/3; 705/67
See application file for complete search history.

(56) References Cited

U.S. PATENT DOCUMENTS

| 6,801,497 | B1 * | 10/2004 | Van Driessche | 370/225 |
| 7,308,413 | B1 * | 12/2007 | Tota et al. | 705/7.11 |
| 7,876,758 | B2 * | 1/2011 | Bullman et al. | 370/392 |
| 2005/0226180 | A1 * | 10/2005 | Devarapalli et al. | 370/328 |
| 2007/0155349 | A1 * | 7/2007 | Nelson et al. | 455/128 |
| 2007/0206535 | A1 * | 9/2007 | Sood et al. | 370/331 |
| 2007/0266065 | A1 * | 11/2007 | Rosenberg | 707/205 |
| 2008/0082648 | A1 * | 4/2008 | Ahmed et al. | 709/223 |

(Continued)

FOREIGN PATENT DOCUMENTS

GB     EP1708527    * 10/2006

OTHER PUBLICATIONS

Bouaziz, "A survey on Mobility Management Protocols in Wireless Sensor Networks based on 6LoWPAN Technology", 2014, Computer Communications, p. 1-13.*

*Primary Examiner* — Taghi Arani
*Assistant Examiner* — Gregory Lane
(74) *Attorney, Agent, or Firm* — Baker and Hostetler LLP

(57) ABSTRACT

A data communication authentication system (10) and method are described. One or more locator nodes (20) are installable at a location (30), the or each locator node (20) including an identifier (21) and a communication system (22) and being arranged to provide said identifier via said communication system (22). The communication authentication system (10) is arranged to generate an authentication code for the location (30) in dependence on identifiers (21) from the one or more locator nodes at the location and is arranged to provide said authentication code on demand for inclusion in a data communication originating locally to said location (30).

18 Claims, 4 Drawing Sheets

(56) References Cited

U.S. PATENT DOCUMENTS

| | | |
|---|---|---|
| 2008/0208817 A1* | 8/2008 | Allsop et al. ............... 707/3 |
| 2009/0094164 A1* | 4/2009 | Fontaine et al. ............ 705/67 |
| 2009/0127486 A1* | 5/2009 | O'Reilly ............... 251/129.04 |
| 2009/0154439 A1* | 6/2009 | Igarashi et al. .......... 370/338 |
| 2009/0238172 A1* | 9/2009 | Tanizawa et al. ......... 370/352 |
| 2009/0303009 A1* | 12/2009 | Itasaki et al. ............. 340/10.1 |
| 2010/0050235 A1* | 2/2010 | Hardie et al. ................ 726/3 |
| 2010/0205316 A1* | 8/2010 | Xue et al. ................. 709/229 |
| 2012/0271469 A9* | 10/2012 | Masters et al. ........... 700/292 |

* cited by examiner

DATA COMMUNICATION AUTHENTICATION SYSTEM AND METHOD

CROSS-REFERENCE TO RELATED APPLICATION

This application is the 35 U.S.C. §371 national stage of, and claims priority to and the benefit of, PCT application PCT/GB2010/051314, filed Aug. 9, 2010, which claims priority to and the benefit of Great Britain Patent Application No. 0913934.6, filed on Aug. 7, 2009, and Great Britain Patent Application No. 1008567.8, filed May 24, 2010, herein incorporated by reference in its entirety.

FIELD OF THE INVENTION

The present invention relates to a data communication authentication system and method that is particularly suitable for authentication of the origin of a data communication.

BACKGROUND TO THE INVENTION

Data communications are becoming ubiquitous. They feature in most aspects of life and are becoming fundamental to households, businesses, personal lives, banking, shopping and communications. The increasing trend of interconnectivity and monitoring of systems and devices means that data communications will become more and more central to our daily lives for even the most mundane tasks.

Unfortunately, data communications are very easily spoofed. A recurring problem is that it is relatively straightforward for someone to pretend to be somebody else (or somewhere else) and produce an otherwise genuine looking data communication. While many networks have introduced safeguards or other countermeasures that look in detail at incoming communications to attempt to identify discrepancies, the truth is that there are loopholes and exploits available and only limited expertise is needed to implement them.

These exploits and spoofed communications are generally used for illicit/improper purposes ranging from unauthorised access of digital media content (it is commonplace for film and television producers to limit distribution to a particular territory so that the material can be syndicated to other territories at some later date to increase revenue) right the way up the scale to persons to scams and fraudulent transactions. While there may be legitimate uses for such exploits and spoofed communications, as a rule they are used to abuse trust or systems in place to protect the rights and property of others.

It is clearly desirable for data communications to be able to bear some mark of authentication. While there exist many authentication systems and methods, many in the field of cryptography using key exchange, shared secrets etc., these are complicated and generally require support from endpoints (which increases their cost and complexity).

One particular issue is the authentication of origin. There are systems that track data communications via network addresses such as IP addresses. However, these can be spoofed and are also unsuitable where a shared IP address is relied upon. Furthermore, the network address is usually provided by the network operator and may therefore be location agnostic. Depending on the manner in which network addresses are allocated, it is possible that a user based in London, UK, may have a network address that is only one increment different from a user having a network address in Durban, South Africa for example.

With the advent of virtual private networks and other tunnelling technologies, it is also possible to obtain a network address that is local to a particular populous whereas in fact the user is operating from a completely different country. Such exploits are well known for use in defeating copyright protection of streamed media such as television programmes where programs may be freely accessible in the country of origin but blocked from other countries in order to allow a network to exploit distribution rights.

STATEMENT OF INVENTION

According to an aspect of the present invention, there is provided a data communication authentication system comprising one or more locator nodes installable at a location, the or each locator node including an identifier and a communication system and being arranged to provide said identifier via said communication system, wherein the communication authentication system is arranged to generate an authentication code for the location in dependence on identifiers from the one or more locator nodes at the location and is arranged to provide said authentication code on demand for inclusion in a data communication originating locally to said location.

The data communication authentication system may further comprise an electrical plug adapter including one of the one or more locator nodes.

The electrical plug adapter may includes an electrical energy consumption meter.

The data communication authentication system may further comprise a remotely controllable valve for a heating system, the remotely controllable valve including one of the one or more locator nodes.

The data communication authentication system may further comprise a public switched telephone network termination unit including one of the one or more locator nodes, the locator node being arranged to provide the authentication code on demand for inclusion in a data communication to be transmitted from the network termination unit.

The or each communication system may include a wireless communication node, the wireless communication node including the locator node.

The wireless communication node may comprises a Zigbee or a 6LoWPAN node or a node of similar functionality.

The data communication authentication system may further comprise a central control node arranged to communicate with the or each locator node to obtain the respective identifier for the or each locator node, wherein the central control node is arranged to generate the authentication code in dependence on the obtained identifiers.

The central control node may be arranged to generate the authentication code from a hash of the obtained identifiers.

The central control node may be arranged to include a unique address identifier in the authentication code, the data communication authentication system further comprising a remotely accessible database linking physical address of a location to the unique address identifier.

The central control node may include a user interface unit. It may form some form of home hub, network access device or the like where important communications, emails or financial transactions are routed for user attention.

The central control node may include a wireless network access point, the central control node being arranged to provide the authentication code to data communications routed through said wireless access point.

The central control node may include a broadband modem.

The data communication authentication system may further comprise a distributed agent network, wherein each of the one or more locator nodes comprises an agent of the distributed agent network, one of the one or more locator nodes assuming the role of the central control node.

The data communication authentication system may further comprise a proxy component arranged to receive data communications originating non-locally to said location and, upon authentication, provide the authentication code for inclusion in data communications originating non-locally.

The data communication authentication system may further comprise a card reader, wherein the card reader is arranged to receive an electronically readable card and to provide data from the card for processing of a transaction, the data communication authentication system being arranged to include the authentication code with the data from the card to authenticate the origin of the data from the card.

The card reader may include a communication system arranged to communicate with one or more of the one or more locator nodes to obtain the authentication code.

The card reader may include an interface for connection to a personal computer and is arranged to provide the authentication code and data from the card for use in processing a transaction on said personal computer.

According to another aspect of the present invention, there is provided a network arrangement comprising a data communication authentication system and a gateway unit, wherein:

the data communication authentication system includes a first wireless communication network node including a locator node, the locator node including an identifier and being arranged to provide the identifier on demand for inclusion in a data communication to be transmitted from the data communication authentication system, the data communication authentication system being connectable to a wired public network for connecting the first wireless communication network node to the wired public network; and, the gateway unit including a second wireless communication network node arranged to communicate with the first wireless communication network node and including an identifier request component arranged to trigger the inclusion of the unique identifier in a communication to the external public wired network from the gateway unit.

According to another aspect of the present invention, there is provided a data communication authentication method comprising:

obtaining identifier(s) from one or more locator nodes installed at a location, the or each locator node including an identifier and a communication system and being arranged to provide said identifier via said communication system;

generating an authentication code for the location in dependence on identifiers obtained from the one or more locator nodes; and, providing said authentication code on demand for inclusion in a data communication originating locally to said location.

According to another aspect of the present invention, there is provided a network termination unit including a location identification system, the location identification system including a unique identifier and being arranged to provide the unique identifier on demand for inclusion in a data communication to be transmitted from the network termination unit.

Preferably, the network termination unit includes wireless communication network node, the wireless communication node including the location identification system.

The wireless communication node may be a low power wireless personal area network such as a 6LoWPAN (see www.6lowpan.org) node.

According to another aspect of the present invention, there is provided a network arrangement comprising a network termination unit and a gateway unit, wherein:

the network termination unit includes a first wireless communication network node including a location identification system, the location identification system including a unique identifier and being arranged to provide the unique identifier on demand for inclusion in a data communication to be transmitted from the network termination unit, the network termination unit being connectable to a wired public network for connecting the first wireless communication network node to the wired public network; and, the gateway unit including a second wireless communication network node arranged to communicate with the first wireless communication network node and including an identifier request component arranged to trigger the inclusion of the unique identifier in a communication to the external public wired network from the gateway unit.

The gateway unit may include a user interface unit, screen and the like. Additionally or alternatively, the gateway unit may provide routing functionality and/or bridge communications from a first network (such as an IEEE 802.11 wireless network—the gateway unit including the appropriate wireless access point) to the second wireless communication node.

BRIEF DESCRIPTION OF THE DRAWINGS

Embodiments of the present invention will now be described in detail, by way of example only, with reference to the accompanying drawings in which.

DETAILED DESCRIPTION

Figure 1:
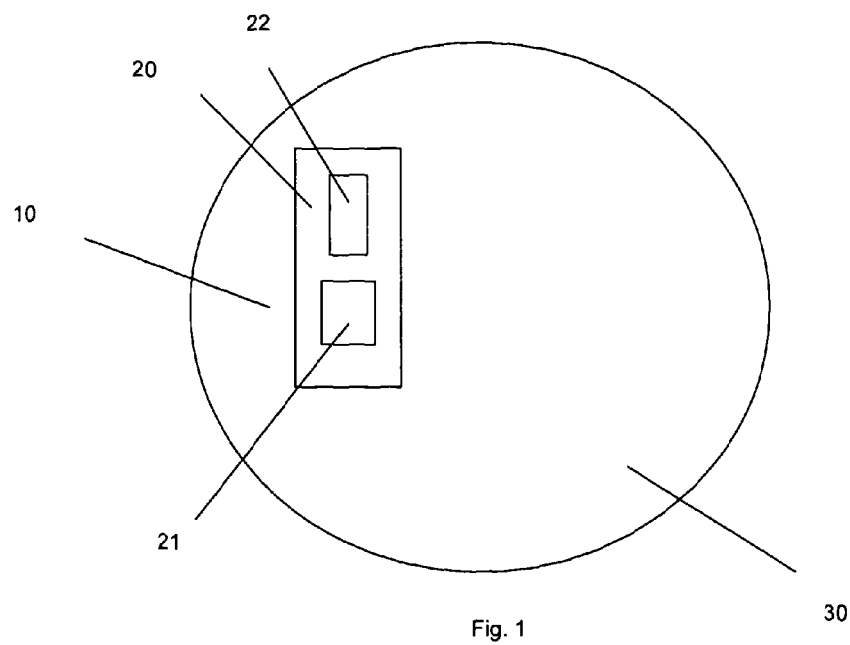
FIG. 1 is a schematic diagram of a data communication authentication system according to an embodiment of the present invention.

FIG. 1 is a schematic diagram of a data communication authentication system according to an embodiment of the present invention.

The data communication authentication system 10 includes a locator node 20 installable at a location 30. The locator node 20 has an identifier 21 and a communication system 22. The locator node 20 is arranged to provide said identifier 21 on demand via said communication system 22.

The communication authentication system 10 is arranged to generate an authentication code for the location in dependence on the identifier 21 from the locator node 20 at the location 30 and is arranged to provide said authentication code on demand for inclusion in a data communication originating locally to said location 30.

Figure 2:
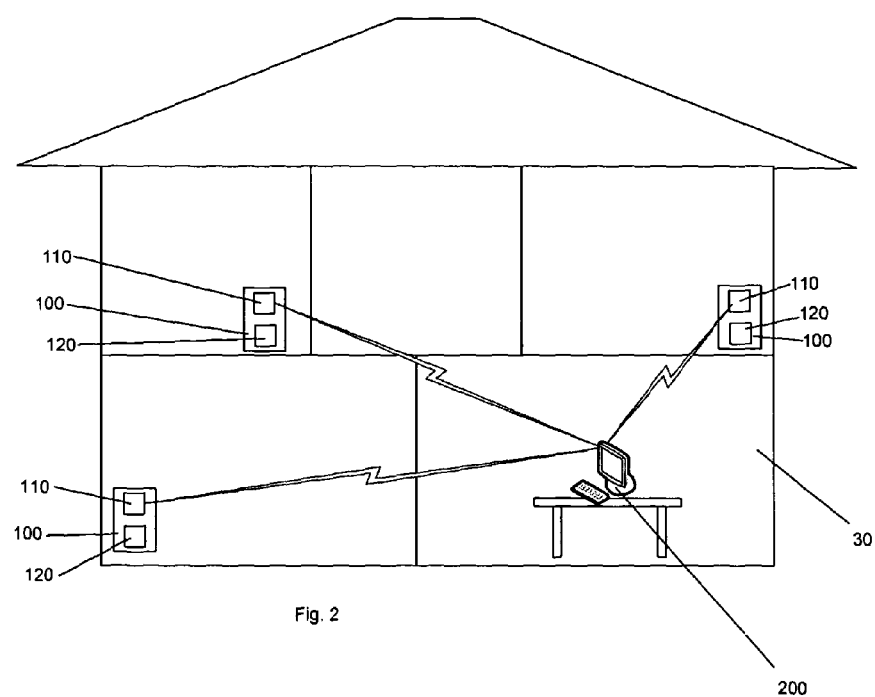
FIG. 2 is a schematic diagram of a data communication system according to a preferred embodiment of the present invention.

FIG. 2 is a schematic diagram of a data communication system according to a preferred embodiment of the present invention (note that the diagram is not drawn to scale).

Figure 3:
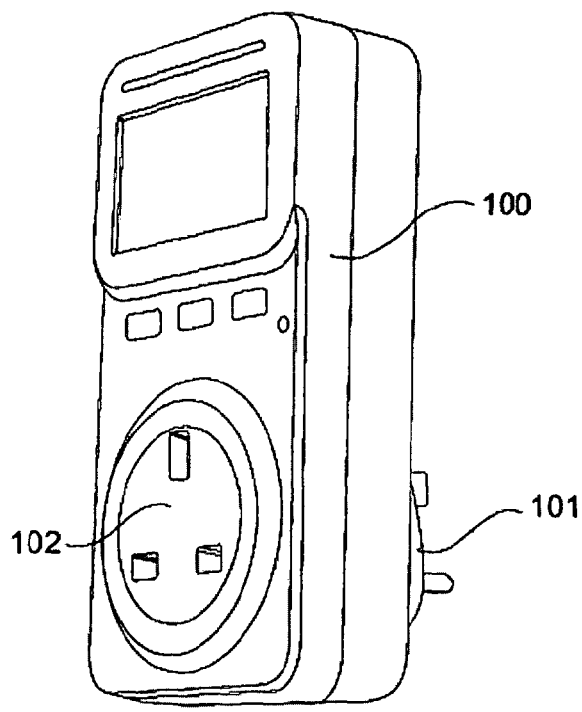
FIG. 3 illustrates a ZigBee enabled plug in an electricity meter module 100 in accordance with one embodiment of the present invention.

The locator nodes 20 are each included within a ZigBee enabled plug in electricity meter module 100 (illustrated in more detail in FIG. 3). Such electricity meter modules are typically electricity plug adapters 100 that have electrical connectors 101 to be plugged into an electricity socket and a receptacle 102 to receive a plug from a device or appliance to be metered. The modules are configured to allow electricity to pass through the connectors 101 to the appliance or device plugged into the receptacle 102 and passively monitor electricity as it is consumed by the appliance or device. In this embodiment, the modules 100 each include a ZigBee component 110 that provides local wireless communication functionality and a memory 120 in which the identifier is stored and/or encoded.

Optionally, the module 100 may include some form of cryptographic or certification component. It will be appreciated that a communication component other than ZigBee could be used (for example the communication component may be a low power wireless personal area network node such as a 6LoWPAN (see www.6lowpan.org), a powerline node or some other communications node type. Similarly, the locator node could be installable in a telephone network termination unit, within or part of an electricity socket, within or part of a radiator valve or some other fixture within the location. In one embodiment, a plurality of locator nodes may be installed in a variety of fixtures, sockets or devices at a location.

It will furthermore be appreciated that while a plurality of locator nodes are preferred at a location in order to establish an authentication code, this is not essential and a sole locator node could be used.

In the embodiment of FIG. 2, a plurality of plug-in electricity meter modules 100 are installed at the location 30 (in this embodiment a house, office or other building). In operation, a central control node 200 communicates with the ZigBee component 110 of each of the plurality of plug-in electricity meter modules to obtain the identifiers from the respective memories 120.

The identifiers are then used by the central control node 200 to generate the authentication code. The authentication code is then applied to communications or transactions originating from the location 30 to authenticate the origin of the communication/transaction.

The authentication code may be some form of cryptographic hash of the identifiers or it may be generated in other ways. Preferably, the authentication code can be consistently reproduced by the central control node 200 (or indeed some other node) when in possession of the identifiers that was used to form the authentication code. In some embodiments, the authentication code may be pre-computed and stored in memory of the locator node. In other embodiments, a plurality of pre-computed authentication codes may be pre-computed and stored and rotated in accordance with some predetermined schedule, upon receipt of some pre-agreed code or upon some other predetermined event (such as challenge of the locator node). Alternatively, the authentication code and/or the identifiers could be some form of PKI based certificate.

It is preferred that the authentication code is varied or rotated over time with the proviso that if the authentication code is ever challenged, it can be reproduced by the central control node 200. Where the code is varied or rotated over time, the variation may be via some form of pseudo random seed and prior values could be stored by the central control node to facilitate reproduction upon challenge.

Preferably, the authentication code also includes a unique address identifier or code that is stored at a remote database which links a physical address of the location to the unique address identifier or code. In this manner, origin of a communication can be identified with reference to the database and, should origin be challenged, the location/network address of the control node can be determined so as to communicate the challenge request.

Optionally, the central control node 200 may be omitted. In such an arrangement, the locator nodes may be operated as a distributed agent network and cooperate (for example by selecting one of their membership to act as controller) to generate the authentication code in a similar manner to that described above.

Preferably, dissemination of the authentication code is controlled and is subject to authentication. Most preferably, dissemination is subject to the requestor being within a predetermined range of the location and/or authenticated with a particular system or component at the location. For example, the control node 200 may operate (or be part of) a local wireless data communication network and may only provide the authentication code to members authenticated on the local network. Alternatively, the control node may be (or interface with) a network gateway, the gateway being the only node authorised to receive the authentication code and being arranged to stamp communications passing out through the gateway with the authentication code.

In another embodiment, a proxy component may be arranged to act as a proxy for devices operating outside the range of the location. For example, a mobile telephone, laptop or the like may be registered with the system 10 and/or proxy. When away from the location, the device can communicate with the proxy to either:
 route all or specified data communications via the proxy (so as to benefit from the authentication code and authentication of origin of the communication); or
 provide the authentication code to the mobile device so it can include the code in its data communications.

The central control node 200 may include a user interface unit, screen and the like. Additionally or alternatively, the central control node 200 may provide routing functionality and/or bridge communications to a first network (such as an IEEE 802.11 wireless network—the central control node 200 including an appropriate wireless access point).

It will be appreciated that there are many uses for functionality where the origin of a data communication can be vouched for. For example, spam impersonators could be blocked by requiring emails to include an authentication code. Electronic transaction operators or other banking operators could use the location guarantee to secure their services (by only allowing account access to a particular registered unique identifier; by treating card transactions bearing the authentication code as a card present type transaction . . . ).

Figure 4:
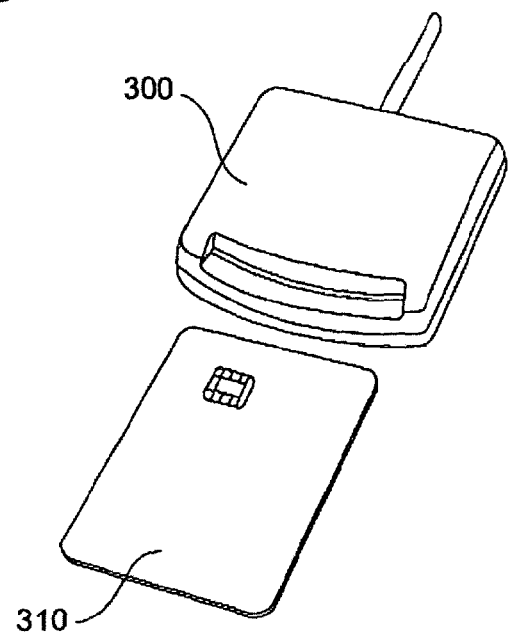
FIG. 4 is an illustration of a card reader for use in a preferred embodiment of the present invention.

In one embodiment, as illustrated in FIG. 4, the central control node 200 may be (or include) a card reader 300. In this embodiment, a smart card reader is illustrated but it will be appreciated that other card reader types could be included or substituted including magnetic stripe card readers, near field card readers etc. In a preferred embodiment, the card reader is connectable (via USB for example) to a Personal Computer. The card reader 300 includes a zigbee component that is paired with a communication authentication system 10 at a location 30.

Upon wishing to pay for a transaction, a user inserts a credit or debit card 310 into the card 300. Where further authentication is needed (for example, a pin number for chip and pin credit/debit cards) then this is obtained (in such a case the card reader may include a keypad). An authentication code from the communication authentication system 10 is then applied to data on the transaction and communicated to the relevant card processing authority for processing and payment. The card processing authority includes a database that links the authentication code to the location and therefore knows the origin of the transaction.

The authentication code may be generated per transaction or periodically. It may be obtained from the communication authentication system 10 per transaction or it may be obtained at the time of pairing and cached by the card reader (in which case the pairing would be checked periodically or per transaction). Preferably, the card reader is only operational whilst the pairing is operational. Should the card reader 300 be taken out of range of the Zigbee network then the pairing is severed and in the preferred embodiment must be re-initialised before the card reader will authorise transactions.

In the above described embodiments, one or more locator nodes provide authentication as to location of communications. It will be appreciated that there are numerous ways that the authentication could be generated. It is preferred that a plurality of locator nodes in combination provide the authentication. Optionally, the authentication code could be produced in such a way that a plurality of locator nodes in combination provide a fingerprint that is registered at a central database or repository. Should a communication be challenged and authentication be requested, the authentication code that the communication bears is compared against the fingerprint and if it matches the fingerprint then it is deemed to have originated at the location registered against the fingerprint (which can then be compared against the origin stated for the communication). In a preferred embodiment, the matching against the fingerprint may be such that only a subset of locator nodes need contribute to the authentication code applied to a communication for it to be deemed to match the fingerprint.

The system may be arranged to allow a fingerprint to be updated (to account for failed/replaced locator nodes etc). It may also be arranged to require different thresholds in respect of numbers of locator nodes having contributed to an authentication code (for example, an authenticator code composed of two or more locator nodes may be deemed sufficient for authenticating location of an email but four or more may be needed for an online transaction).

A data communication said to be originating locally to a location may be a data communication originating at the location or within a predetermined range of the location. Proximity to the location could be determined by a number of factors such as connection to a wired or wireless network operational only at the location; signal strength; use of geolocation services such as network triangulation or GPS; physical connection to a network node at the location; past physical connection to a network node at the location within a predetermined time window.

Figure 5:
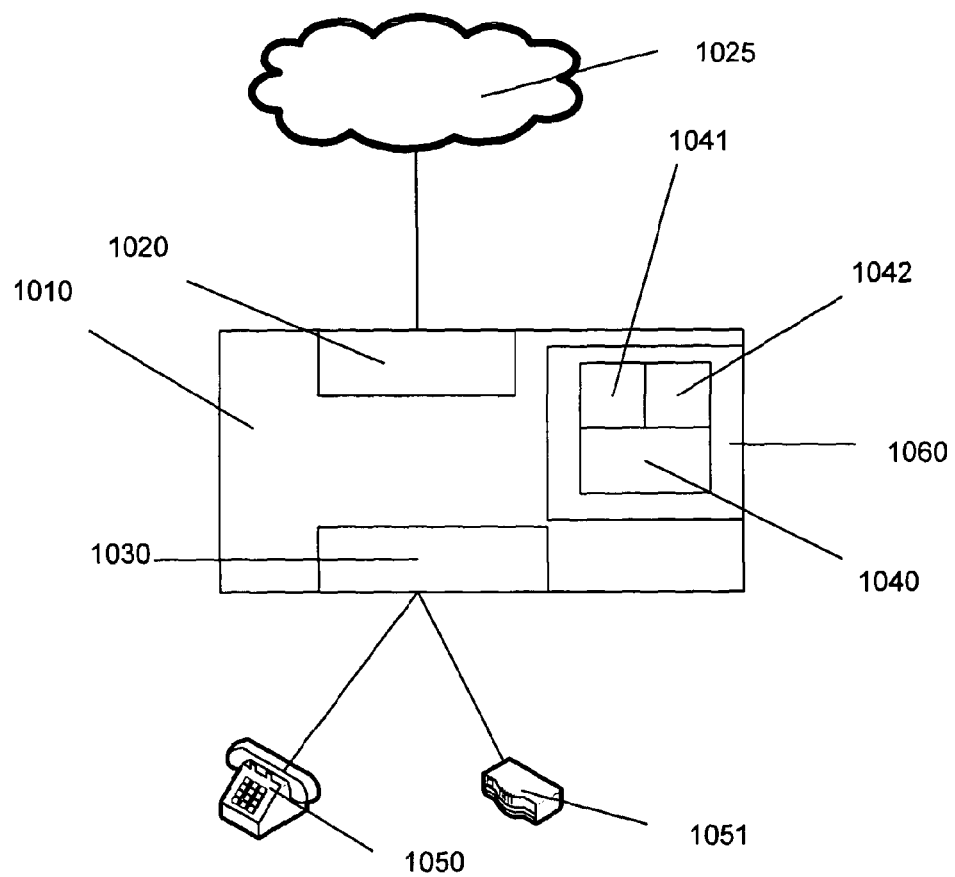
FIG. 5 is a schematic diagram of a network termination unit according to another embodiment of the present invention; and, FIG. 6 is a schematic diagram of a network arrangement according to another embodiment of the present invention including the network termination unit of FIG. 5.

FIG. 5 is a schematic diagram of a network termination unit according to another embodiment of the present invention.

A network termination unit (NTU) is a unit that connects a public switched telephone network (PSTN) to customer premises equipment (CPE).

Although traditionally used to provide voice telephony services to a premises, NTUs today commonly have a dual role of providing both voice and data services to a premises. The advent of ADSL based broadband has enabled consumers, particularly residential consumers, to obtain high speed access to the Internet. This dual mode of voice and data at an NTU is addressed by an internal or external splitter that divides signals for the two services and directs them to one of two connection ports.

In the illustrated embodiment, the network termination unit (NTU) 1010 includes a cabled network termination node 1020, a consumer connection port 1030 and a locator node 1040. The NTU 1010 terminates a cabled network 1025 at a customer's premises via the cabled network termination node 1020. Consumer equipment (such as telephony devices 1050, ADSL modems 1051 and the like) can be connected to the network 1025 at the port 1030. The port 1030 may include a splitter to result in two ports dividing DSL/ADSL (data) traffic from voice traffic. In another alternative, the port 1030 may be arranged to interface with an external splitter. In yet another alternative described below, the NTU itself may act as a data modem such that the port only services voice devices and a wireless network is provided for data from the NTU.

The locator node 1040 in this embodiment includes a memory 1041 and a processing system 1042.

An identifier that is unique to the NTU 1010 is recorded in the memory 1041. The processing system is arranged to provide the unique identifier on demand for inclusion in a data communication to be transmitted from the network termination unit 1010.

In a preferred embodiment, the network termination unit 1010 includes a wireless communication network node 1060, the wireless communication node 1060 incorporating the locator node 1040.

The wireless communication node may be a low power wireless personal area network such as a 6LoWPAN or zigbee node.

The wired network 1025 may be the internet.

Figure 6:
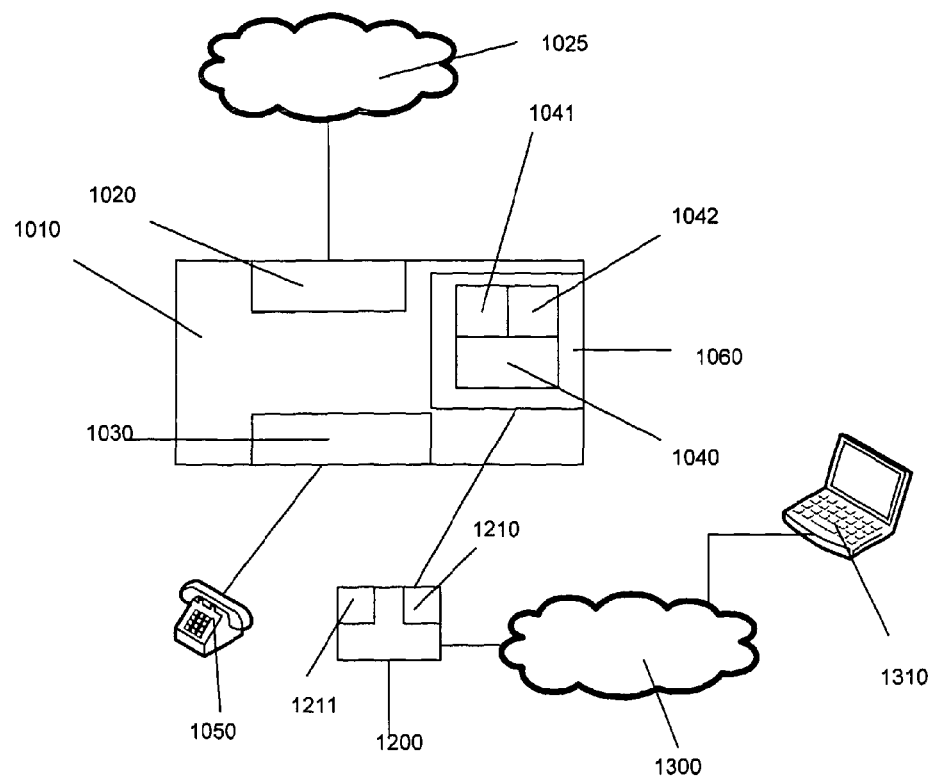

FIG. 6 is a schematic diagram of a network arrangement incorporating the network termination unit of FIG. 5.

The network arrangement includes a network termination unit 1010 as discussed above with reference to FIG. 1 and a gateway unit 1200.

The network termination unit 1010 includes a first wireless communication network node 1060 including the locator node 1040. The network termination unit 1010 is connectable to a wired public network 1025 for connecting the first wireless communication network node 1060 to the wired public network 1025.

The locator node 1040 includes a memory 1041 encoding a unique identifier. The first wireless communication node 1060 is configured to provide the unique identifier on demand for inclusion in a data communication to be transmitted from the network termination unit 1010.

The gateway unit 1200 includes a second wireless communication network node 1210 arranged to communicate with the first wireless communication network node 1060 of the NTU 1010. The gateway unit 1200 includes an identifier request component 1211 arranged to trigger a request for the inclusion of the unique identifier in a communication to the external public wired network from the gateway unit.

In use, communications originate or are otherwise routed from the gateway unit 1200. On demand, those communications can be location stamped to include the unique identifier. The gateway unit 1200 may obtain the unique identifier from the NTU to include, encode, incorporate or otherwise utilise the identifier in communications to vouch for the origin of the communication. Alternatively, this functionality may be incorporated into the NTU 1010 and the gateway unit 1200 may simply ask that an outgoing communication is included, encoded, incorporated or otherwise utilised in the communication to vouch for the origin of the communication.

The gateway unit 1200 may preferably act as a WIFI router and establish a WIFI network 1300. Devices 1310 accessing the WIFI network 1300 can then route communications to the internet 1025 via the gateway unit 1200, second wireless communication node 1210, first wireless communication node 1060, and NTU 1010. Access to the unique identifier for communications to the internet 1025 can be provided to the devices 1310 as long as they access the internet 1025 via the gateway unit 1200.

It will be appreciated that various embodiments and arrangements have been discussed and illustrated. The various arrangements may be interchanged as needed for individual implementations (for example, the locator nodes need not be all installed in the same type of device). Similarly, components such as the proxy and control node may be optionally used as desired.

What is claimed is:

1. A data communication authentication system comprising one or more locator nodes installable at a location, each of the one or more locator nodes including an identifier and a communication system and being arranged to provide said identifier via said communication system, wherein the data communication authentication system is arranged to generate, at the location, an authentication code for the location in dependence on identifiers from the one or more locator nodes at the location and is arranged to provide said authentication code on demand for inclusion in a data communication originating locally to said location, the authentication code being in addition to existing content of the data communication; and
   wherein the communication system further includes a wireless communication node, the wireless communication node including the locator node, wherein the wireless communication node comprises a Zigbee or a 6LoWPAN node.

2. A data communication authentication system according to claim 1, further comprising an electrical plug adapter including one of the one or more locator nodes.

3. A data communication authentication system according to claim 2, wherein the electrical plug adapter includes an electrical energy consumption meter.

4. A data communication authentication system according to claim 1, further comprising a remotely controllable valve for a heating system, the remotely controllable valve including one of the one or more locator nodes.

5. A data communication authentication system according to claim 1, further comprising a network termination unit including one of the one or more locator nodes, the locator node of the network termination unit being arranged to provide the authentication code on demand for inclusion in a data communication to be transmitted from the network termination unit.

6. A data communication authentication system according to claim 1, further comprising a central control node at the location arranged to communicate with the one or more locator nodes to obtain the respective identifier for each of the one or more locator nodes, wherein the central control node is arranged to generate the authentication code in dependence on the obtained identifiers.

7. A data communication authentication system according to claim 6, wherein the central control node is arranged to generate the authentication code from a hash of the obtained identifiers.

8. A data communication authentication system according to claim 6, wherein the central control node is arranged to include a unique address identifier in the authentication code, the data communication authentication system further comprising a remotely accessible database linking a physical address of a location to the unique address identifier, wherein upon receiving a challenge of an origin of the data communication, the data communication authentication system is configured to access the remotely accessible database to determine a network address of the central control node corresponding to the unique address identifier of the data communication and to communicate the challenge to the central control node.

9. A data communication authentication system according to claim 6, wherein the central control node includes a wireless network access point, the central control node being arranged to provide the authentication code to data communications routed through said wireless access point.

10. A data communication authentication system according to claim 9, wherein the central control node includes a broadband modem.

11. A data communication authentication system according to claim 1, further comprising a proxy component arranged to receive data communications originating non-locally to said location and, upon authentication, provide the authentication code for inclusion in data communications originating non-locally.

12. A data communication authentication system according to claim 1, further comprising a card reader, wherein the card reader is arranged to receive an electronically readable card and to provide data from the card for processing of a transaction, the data communication authentication system being arranged to include the authentication code with the data from the card to authenticate the origin of the data from the card.

13. A data communication authentication system according to claim 12, wherein the card reader includes a communication system arranged to communicate with one or more of the one or more locator nodes to obtain the authentication code.

14. A data communication authentication system according to claim 12, wherein the card reader includes an interface for connection to a personal computer and is arranged to provide the authentication code and data from the card for use in processing a transaction on said personal computer.

15. A network arrangement comprising a data communication authentication system and a gateway unit, wherein:
   the data communication authentication system includes a first wireless communication network node including a locator node, the locator node including an identifier and being arranged to provide the identifier on demand for inclusion in a data communication to be transmitted from the data communication authentication system, the data communication
   authentication system being connectable to a wired public network for connecting the first wireless communication network node to the wired public network;
   the gateway unit including a second wireless communication network node arranged to communicate with the first wireless communication network node and including an identifier request component arranged to trigger the inclusion of the identifier in a communication to the wired public network from the gateway unit, the identifier being in addition to existing content of the communication; and
   wherein the first and second wireless communication nodes comprise a Zigbee or a 6LoWPAN node.

16. A data communication authentication method comprising:
   obtaining identifiers from each of one or more locator nodes installed at a location, each of the one or more locator nodes including an identifier and a communication system and being arranged to provide said identifier via said communication system, wherein the communication system further includes a wireless communication node, the wireless communication node including the locator node comprising either a Zigbee or a 6LoW-PAN node;

generating, at the location, an authentication code for the location in dependence on identifiers obtained from the one or more locator nodes; and, providing said authentication code on demand for inclusion in a data communication originating locally to said location, the authentication code being in addition to existing content of the data communication.

17. The data communication authentication system of claim 12, wherein the card reader includes a cache to cache the authentication code and is further configured to provide the cached authentication code whilst the card reader is in range of one or more of the one or more locator nodes, the card reader being arranged to refuse to provide the authentication code to authorize transactions upon the card reader being out of range of the one or more locator nodes until communication with one or more of the one or more locator nodes is re-established.

18. The data communication authentication system of claim 1, wherein the authentication code is pre-computed and stored in a memory of one or more of the locator nodes to be provided on demand for inclusion in a data communication originating locally to said location.

* * * * *